Patented Jan. 31, 1933

1,896,055

UNITED STATES PATENT OFFICE

WALTER A. PATRICK, OF BALTIMORE, MARYLAND, AND EARLE H. BARCLAY, OF HAMILTON, OHIO, ASSIGNORS TO THE SILICA GEL CORPORATION, OF BALTIMORE, MARYLAND, A CORPORATION OF MARYLAND

PLURAL GELS AND METHOD OF PREPARING SAME

No Drawing.   Application filed January 21, 1931.   Serial No. 510,322.

The present application which is a continuation in part of applications Serial No. 179,387, filed March 29, 1927, and Serial No. 252,671, filed February 7, 1928, relates to plural or mixed gels, and processes for preparing the same.

Briefly stated, the process comprises mixing the individual sols together, and converting the jelly that forms into a hard, stable, highly porous gel.

Any sols capable of being converted into highly porous gels containing one or more colloidal oxides such as silica, tungstia, titania, stannia, and the like, may be employed.

The sols may be mixed together in any proportions depending upon the relative amounts of the different gels desired in the final product. Preferably, all of the sols used should be acid or all should be alkaline in character.

According to the present invention, to prepare the desired stable, highly porous gel of the oxides of silica and tungsten, sols for each oxide are prepared, that is to say, a sol of silicic acid of such concentration and proportion that if taken by itself will form a jelly which can be washed and dried to give a hard, highly porous final product, and a sol of tungstic acid that likewise by itself will form a jelly that can be washed and dried to give a hard, porous tungstic gel.

A sol of tungstic acid may be prepared by adding a solution of an acid, such as hydrochloric acid or sulphuric acid, to a solution of sodium tungstate of about 3 to 8% strength, with stirring until a precipitate is formed. This requires only a small amount of acid. The reaction mass is then stirred until the precipitate dissolves, whereupon more acid is added, the total amount of acid used being such as to give a final acidity of the whole mixture, after the reaction, equal to about 0.1 N. to 0.5 N. With this acidity, the reaction mixture or sol will coagulate or set to a jelly in a few minutes, say from 4 to 30 minutes at room temperature.

At a higher temperature the setting occurs more quickly, and at lower temperatures more slowly. A good working range for the temperature is 15° C. to 80° C., but it is to be understood that it is not necessary to work within this range.

The tungstate and acid solutions may be mixed together in almost any manner desired, for example by confluence of streams of the solutions with stirring, provided there is an excess of the tungstate solution over the acid solution during the first part of the mixing.

In another method of mixing the ingredients, the acid solution is added, at first drop by drop, to the sodium tungstate solution, with stirring. At first a white precipitate forms, upon the addition of each drop of acid, which re-dissolves on stirring. After about half of the required acid has been added, the precipitate no longer forms, and the balance of the acid may then be added rapidly.

The sol of silicic acid may be prepared by mixing, with vigorous stirring, solutions of an acid and a soluble silicate of such proportions and concentrations as to give a sol having an acidity ranging from nearly neutral to 0.9 N.

These two sols are then mixed together and form a jelly which is broken into pieces and washed free from acid and salt. If the wash water is heated, this step is expedited.

The washed hydrogel is now carefully dried to secure the final product. For this purpose the hydrogel may be dried first in a stream of air at 75° to 120° C. and later at a higher temperature which may be 300° to 400° C. The hydrogel may be dried at a lower temperature, say 120° C., but this will take a longer time. The drying is continued until the water content of the final product is 5–15%, although the invention is not limited to dehydrating to these percentages. In a general way, it may be stated that the hydrogel is dehydrated to the desired water content which is generally not less than 3%. The hydrogel may be dehydrated in other ways known in the art.

The final product is a hard, stable, highly porous gel of the oxides of silica and tungsten. The better products will adsorb water vapor to such an extent as to contain at least 21% of its weight (dry) of water when in equilibrium with water vapor at 30° C. and a partial pressure of 22 mm. of mercury, but products which adsorb less are also included in this invention.

To prepare a plural or mixed gel containing the colloidal oxides of stannia and tungstia according to the present invention, a sol capable of being converted into a hard, porous gel of stannia is made by mixing equal volumes of a 2.5 to 3% ammonium hydroxide solution and a 10% stannic chloride solution together with agitation. The resulting sol has an acidity of about 0.13 to 0.18 N. acid.

The stannia sol thus formed is mixed with the sol of tungstia made in the manner previously described, and the mixture of sols allowed to coagulate as a whole to a hydrogel. The hydrogel is then washed, and dried in the manner previously described.

A plural or mixed gel containing the colloidal oxides of stannia, silica and tungstia is prepared according to the present invention by mixing the sol capable of being converted into a hard, porous gel containing the colloidal oxides of stannia and tungstia with a sol of silica prepared in the manner previously described. The sol containing stannia and tungstia may be prepared by forming a mixture of a stannic salt solution and a tungstate solution as by mixing 50 cc. of an 8% sodium tungstate solution and 100 cc. of a 10% stannic chloride solution together. To this mixture is then added gradually, 20 cc. of a 10% ammonium hydroxide solution with agitation. It is also possible to add the ammonium hydroxide to the sodium tungstate solution, and then add such mixture to the stannic chloride solution with agitation. The resulting mixture in each case is slightly acid.

The mixture of sols form a jelly which is washed, and dried in the manner previously described.

The term "jelly" designates a hydrogel and/or gelatinous precipitate.

Having thus described the invention, what is claimed as new and desired to be secured by Letters Patent is:

1. The process of preparing hard, stable, highly porous gels comprising two or more colloidal oxides consisting in mixing a sol capable of being converted into a highly porous gel containing a colloidal oxide with a sol capable of being converted into a highly porous gel containing a different colloidal oxide, and converting the jelly which forms into a hard, porous gel.

2. The process of preparing hard, stable, highly porous gels comprising two or more colloidal oxides consisting in preparing individual sols each of which is capable of being converted into a highly porous gel comprising a single oxide, mixing these sols together, washing and nearly dehydrating the jelly which forms.

3. The process of preparing hard, stable, highly porous gels comprising oxides of silica and tungsten, consisting in preparing individual sols each of which is capable of being converted into a highly porous gel comprising a single oxide, mixing these sols together, washing and nearly dehydrating the jelly which forms.

In testimony whereof we hereunto affix our signatures.

WALTER A. PATRICK.
EARLE H. BARCLAY.